United States Patent [19]

McLain

[11] 4,283,446

[45] Aug. 11, 1981

[54] FIBER REINFORCED PLASTIC MEMBERS

[75] Inventor: Philippe H. McLain, Columbia, S.C.

[73] Assignee: Shakespeare Company, Columbia, S.C.

[21] Appl. No.: 823,977

[22] Filed: Aug. 12, 1977

Related U.S. Application Data

[62] Division of Ser. No. 720,907, Sep. 7, 1976, Pat. No. 4,089,727.

[51] Int. Cl.³ .................... D03D 13/00; D02G 3/00
[52] U.S. Cl. .................................. 428/36; 428/222; 428/371; 428/376; 428/377; 428/378
[58] Field of Search .............. 428/36, 222, 376, 377, 428/378, 371

[56] References Cited

U.S. PATENT DOCUMENTS

| | | | |
|---|---|---|---|
| 2,843,153 | 7/1958 | Young | 428/36 |
| 3,429,758 | 2/1969 | Young | 428/377 |
| 3,574,104 | 4/1971 | Medler | 428/36 |
| 3,969,557 | 7/1976 | Jenks | 428/377 |
| 3,998,458 | 12/1976 | Inoue et al. | 273/80 R |

Primary Examiner—William R. Dixon, Jr.
Attorney, Agent, or Firm—Hamilton, Renner & Kenner

[57] ABSTRACT

The present invention relates to FRP members, the apparatus and process for making same. The FRP members are reinforced with helical strands of reinforcing material disposed in expanded helices of opposite hand, the helices of each hand being contained in discrete layers. The lead angle of each helix may be constant or varied along the length of the member independently of whether the member is cylindrical or tapered in order to provide the desired structural characteristics. The process comprises impregnating the reinforcing strands with resin and wrapping those strands onto a mandrel by apparatus in which relative rotational as well as relative translatory movement between the mandrel and a winding head may be effected to wrap the strands onto the mandrel. At least one relative movement may be selectively varied to effect the desired lead angle to the helically disposed reinforcing strands along the length of the mandrel.

4 Claims, 11 Drawing Figures

FIBER REINFORCED PLASTIC MEMBERS

This is a division of application Ser. No. 720,907, filed Sept. 7, 1976, now U.S. Pat. No. 4,089,727.

BACKGROUND OF THE INVENTION

Golf clubs, fishing rods and even utility poles are being made from resinous material incorporating a fiber, or fibrous, reinforcement—more specifically, such goods are being made from liquid, thermosetting resins incorporating roving, fabrics or matted materials and the reinforcement. Goods made from fiber reinforced resin material are, appropriately, designated as FRP members, and one of the principle ways in which FRP members are made is by helically winding a succession of resin impregnated reinforcing strands about a mandrel.

According to prior art techniques, one or more strands, or ribbons, of the reinforcing material is wound onto the mandrel, beginning at a first end thereof, in a helical configuration of one hand, and one or more successive strands, or ribbons, is wound, beginning at the second end thereof, onto the mandrel in a helical configuration of opposite hand. These steps are thereafter repeated with successive strands being wound adjacent the previous winding of like hand until the mandrel is completely covered and the desired thickness is acquired. Thereafter the member is cured.

By employing a successive series of wraps at opposite hand each reinforcing strand after the first lay is crimped as it accommodates to each crossover of previously laid strands. This crimping induces a stress concentration at the crossover when the finished product is stressed and also creates a small interstice where only the resin exists. Overall, this arrangement cannot, therefore, achieve the desideratum in mechanical properties which should be available from the material employed.

In addition, winding of the reinforcing strands has heretofore been accomplished by the use of winding heads that move at a constant rate along the mandrel as the latter rotates at a constant rate. Accordingly, if the mandrel tapers, say from the butt to the tip, the lead angle of the helical wrap will progressively increase from the butt to the tip. As the lead angle increases, the orientation of the reinforcing wrap changes to increase the flexural resistance provided by the reinforcing material. For many applications, such as with fishing poles, it is highly undesirable to increase flexural resistance in the tip portion of the rod.

Moreover, when the lead angle increases the torsional resistance decreases, and for many applications, notably as with golf club shafts, it is highly undesirable to decrease torsional resistance in the tip portion.

It must be appreciated that the FRP members to which the subject invention is directed are those which include reinforcing filaments disposed in an expanded helix and not those in which the filaments are all wound in a tight spiral where each wrap of a reinforcing filament engages the previous wrap of that same filament. Nor is the subject invention directed to FRP members in which the reinforcing filaments are either all longitudinally for a configuration of reinforcing filaments that are disposed in part longitudinally and in part in the aforesaid tight spiral.

SUMMARY OF THE INVENTION

It is, therefore, a primary object of the present invention to provide an FRP member in which discrete layers are formed by reinforcing filaments disposed in expanded helices of common hand in order to obviate crimping of the reinforcing strands at crossovers and also to eliminate the resulting interstices.

It is another object of the present invention to provide an FRP member, as above, in which the lead angle of the helically disposed reinforcing strands can be selectively varied along the length of the member in order to provide the desired balance of hoop strength, flexural stiffness and torsional stiffness along the length of the member.

It is a further object of the present invention to provide a method by which to make FRP members, as above.

It is a still further object of the present invention to provide novel apparatus that is relatively inexpensive to build, operate and maintain, and which operates according to the method hereof, in order to produce FRP members embodying the concepts of the present invention.

These and other objects, together with the advantages thereof over existing and prior art forms, which will become apparent from the following specification, are accomplished by means hereinafter described and claimed.

In general, the process of the present invention is directed to the manufacture of FRP members which can be formed by wrapping strands of resin impregnated reinforcing material helically about a mandrel, curing the resin and removing the finished member from the mandrel. The direction and rate of relative movement between the rotating mandrel on which the impregnated reinforcing strands are wrapped and the winding head which feeds the strands onto the mandrel are coordinated to achieve the desired disposition of the helically wrapped reinforcing strands at any given section along the FRP member being made thereby.

The novel apparatus employed to practice the aforesaid method and produce FRP members embodying the concept of the present invention effects relative axial as well as rotational movement between the mandrel and the winding head—the rates of at least one of these relative movements being selectively varied to provide the desired helical lay of the reinforcing filaments from section to section throughout the FRP member.

One preferred, and two alternative, embodiments of apparatus by which articles embodying the concept of the present invention may be made, together with an exemplary form of such an article, are shown by way of example in the accompanying drawings and described in detail, along with the method of the subject invention, without attempting to show all the various forms and modifications in which the invention might be embodied; the invention being measured by the appended claims and not by the details of the specification.

DESCRIPTION OF THE PREFERRED EMBODIMENTS

Figure 1:
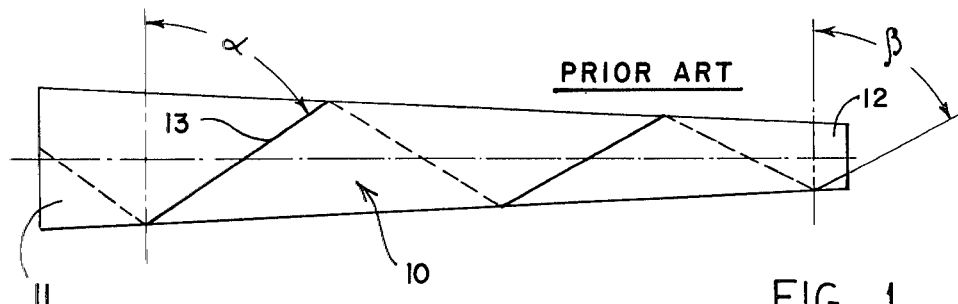
FIG. 1 is a schematic representation of a tapered mandrel which depicts the change in the lead angle of the helically disposed reinforcing filaments when applied according to the prior art apparatus, methods and techniques.
Figure 2:
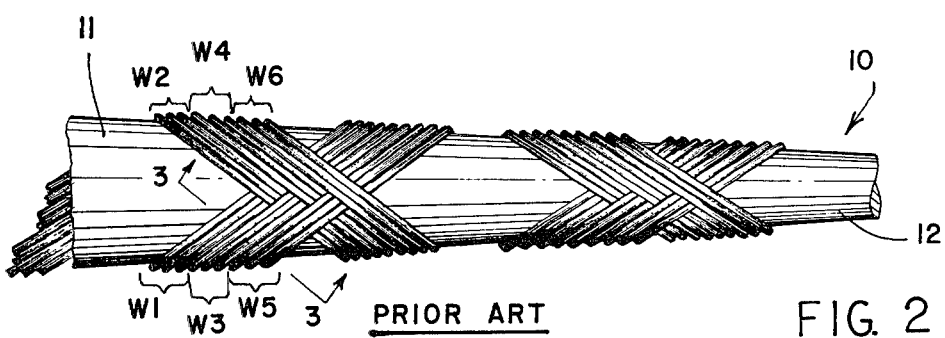
FIG. 2 is an elevation of a portion of a tapered mandrel which depicts the expanded helical lay of reinforcing filaments thereon when wound according to prior art methods, apparatus and techniques—for clarity the mandrel is only partially covered by said reinforcing filaments.

By way of background, an FRP member may be made according to prior art techniques on a mandrel, even a tapered mandrel as identified generally by the numeral 10 in FIGS. 1 and 2 of the attached drawings. It will be noted that mandrel 10 tapers from the butt 11 to tip 12, and an exemplary reinforcing strand 13 is emphasized in FIG. 1 to depict the helical orientation which results when the strand is wound onto a mandrel that is rotated at a constant rate while the winding head moves along the mandrel at a constant rate. As depicted, the lead angle $\alpha$ in proximity to the butt 11 is lesser than the lead angle $\beta$ in proximity to the tip 12. This occurs even though the distance along which the winding head moves during one revolution of the mandrel remains constant throughout the length of the mandrel because the diameter of the mandrel gets smaller.

To explain, the distance along which the winding head moves during one revolution of the mandrel can be considered as the side of a right triangle opposite the lead angle; the filament wound onto the mandrel is equivalent to the hypotenuse of that triangle; and, the average circumference of the mandrel along the distance traveled by the winding head during the referenced revolution of the mandrel is equivalent to the side adjacent the lead angle represented in the aforesaid right triangle. Because the circumference of the mandrel is a direct function of its diameter, and because the diameter gets progressively smaller as the winding head moves from the butt toward the tip, the tangent of the lead angle also progressively increases, as does the angle itself.

Test results clearly demonstrate that an increase in the lead angle of the reinforcing filaments in a member effects a corresponding increase in the flexural stiffness of that member. As such, if an FRP member made on a mandrel according to the prior art techniques were to be used as a fishing rod, it would be found that the flexural stiffness of the rod increases toward the tip—the exact opposite of the desired result.

Test results have also revealed that the greatest torsional stiffness is achieved when the lead angle of the reinforcing filaments is approximately 45°. Thus, were the resulting FRP member to be used as a golf club shaft, the torsional stiffness would vary along the length of the shaft as the lead angle varied above or below 45°—also an undesirable result.

Figure 3:
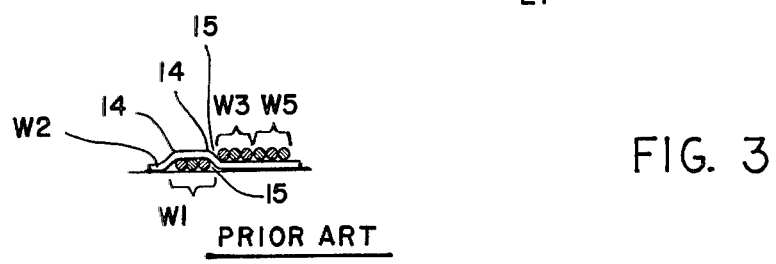
FIG. 3 is a partial cross section taken substantially on line 3—3 of FIG. 2.

Two further, though related, deficiencies inherent to FRP members made according to the prior art concepts of filament winding are depicted in FIGS. 2 and 3. In FIG. 2 six successive wraps, designated as $W_1$ through $W_6$, are depicted. As can best be observed in FIG. 3, each successive wrap is crimped, as at 14, when it crosses over the edge of the previously deposited strand, or strands, leaving an interstice 15 in which only the resin will exist. Even though a plurality of strands may be wound at one time—three are depicted in FIGS. 2 and 3—as each successive wrap is applied it will have crimped over the previously applied wraps until the mandrel is covered. Should the wrapping process continue to apply successive layers, corresponding crimps and interstices will also occur in the successive layers.

Figure 4:
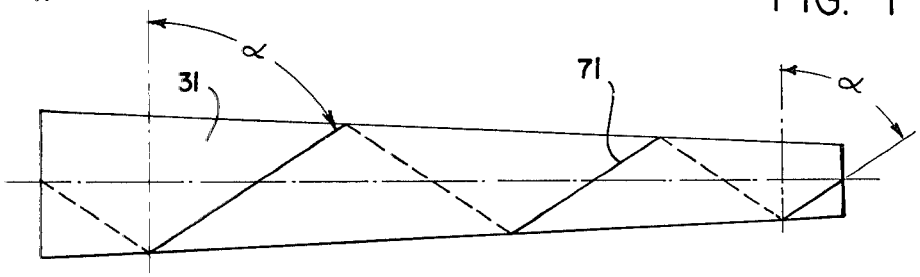
FIG. 4 is a view similar to FIG. 1 but depicting, as a selected lay, a constant lead angle for the helically disposed reinforcing filaments when wound onto a tapered mandrel according to the concepts of the present invention.
Figure 5:
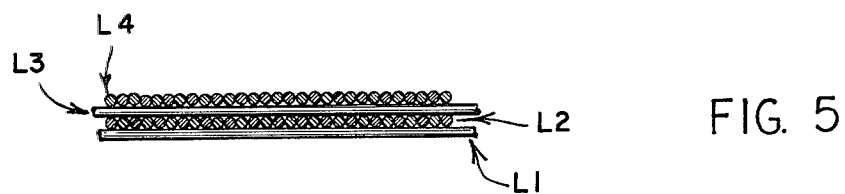
FIG. 5 is a view generally similar to FIG. 3 but depicting the discrete layers of filaments achieved when wound onto a mandrel according to the present invention.

The foregoing problems, which are inherent to the prior art techniques, are obviated by the present invention, and as will become apparent from the detailed description of the apparatus hereinafter set forth, an FRP member can be made in which the reinforcing filaments of each hand lie in discrete layers without crimping and without the resulting interstices. FIG. 5, for example, depicts four such discrete layers—$L_1$ through $L_4$—the alternate layers being of opposite hand. The present invention also permits the lead angle to remain constant throughout the length of the member irrespective of whether the mandrel is cylindrical or tapered, as represented by FIG. 4, wherein the mandrel 31 of the apparatus 30 hereinafter described in conjunction with the apparatus depicted in FIGS. 6 through 9 is schematically represented with a single wrap of a reinforcing strand 71 to show the constant lead angle $\alpha$ along the full extent of the mandrel. Alternatively, the lead angle may be altered according to a preselected pattern.

References to FIGS. 6–9 reveals one embodiment of an apparatus indicated generally by the numeral 30 by which to fabricate an improved FRP member according to the concept of the present invention.

Figure 6:
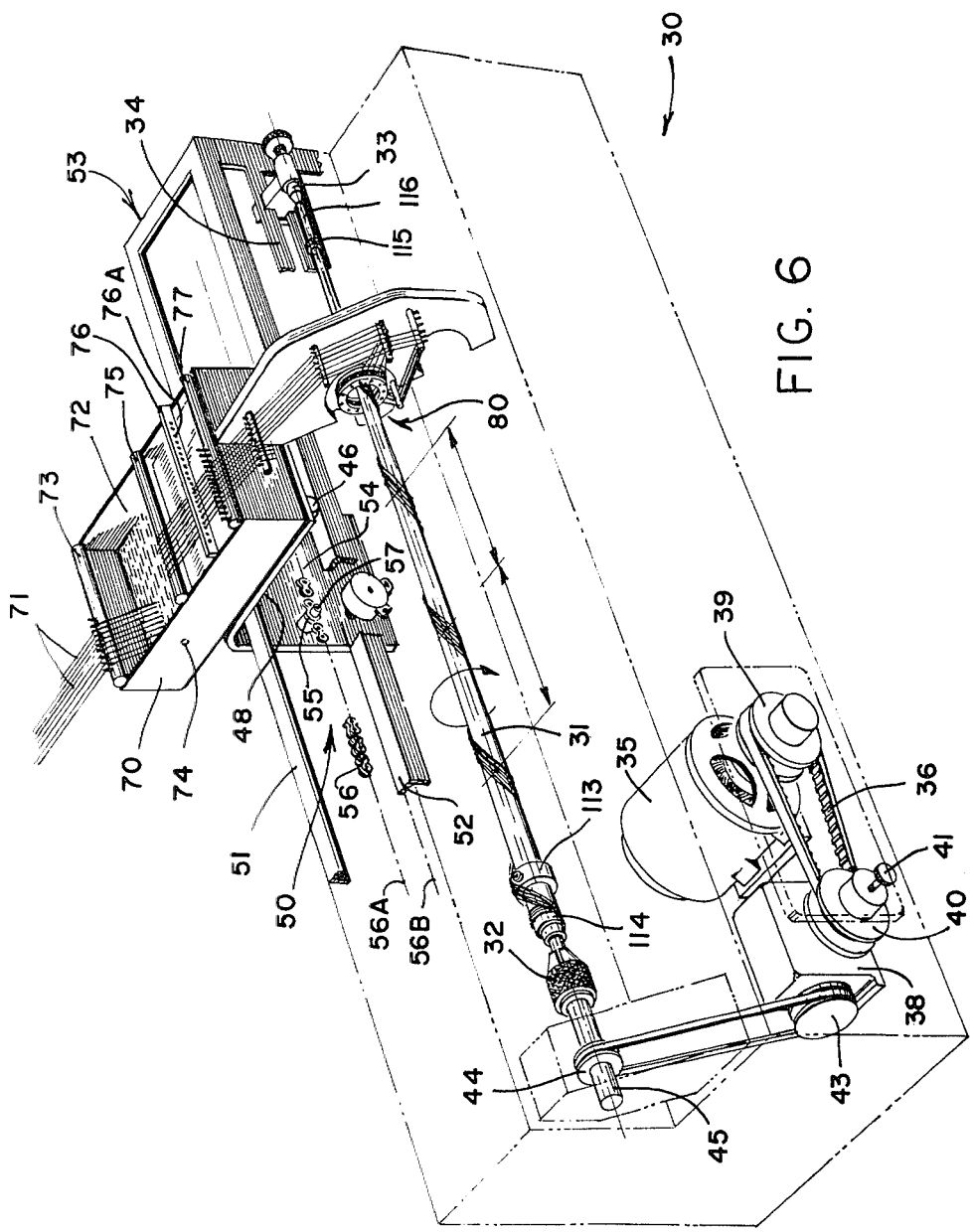
FIG. 6 is a schematic, frontal perspective of an apparatus embodying the concept of the present invention, and capable of performing the method thereof, which, for clarity, is depicted as winding a portion of the reinforcing filaments onto a tapered mandrel—it being understood that said apparatus is capable of winding an entire discrete layer at one pass.

As best seen in FIG. 6, a mandrel 31 of tapered section is rotatably mounted between the live spindle 32 and a dead spindle 33. The dead spindle 33 may be adjustably secured along a track 34 to accommodate mandrels of various lengths, and the live spindle 32 is rotated by an operative connection with a motor 35. As shown, a drive belt 36 connects the motor 35 to a gear reducer 38 through variable speed pulleys 39 and 40 which may be manually operated by knob 41, which changes the diameters of pulleys 39 and 40 to control the speed plateau at which the motor pulley 39 drives the input pulley 40 on gear reducer 38. Similarly, the output pulley 43 of the gear reducer 38 may be connected to the driven pulley 44 on the shaft 45 of the live spindle 32.

Wheels 46 presented from the horizontal base plate 48 of a trolley 50 are movable along tracks 51 and 52 formed by angle irons on the frame 53 of apparatus 30. An arm 54 is secured to, and extends downwardly from, the base plate 48 of trolley 50. One link 55 of a chain drive 56 is secured to the trolley 50, as by pin 57, and the chain itself is reeved about registered sprocket wheels 58 and 59. The idler sprocket 58 is mounted at one end of the frame 53 and the drive sprocket 59 is secured to a shaft 60 rotatably mounted at the opposite end of the frame 53 where it is rotated by a second motor 61 connected through gear reducer 62 and chain drive 63 to a second sprocket 64 on shaft 60.

To reciprocate the trolley 50 the sprocket wheels 58 and 59 may be mounted on cantilevered axles, and the pin 57 may be vertically slidable in arm 54 in order to follow the link 55 as it traverses the upper and lower runs 56A and 56B, respectively, of the chain drive 56. Alternatively, a pair of opposed micro switches 65 and 66, as depicted in FIG. 7, may be actuated by trip arms 68 and 69, respectively, carried on the arm 54 to reverse the motor 61 and thereby reciprocate the trolley 50.

The trolley 50 carries an immersion tank 70 within which the reinforcing strands 71 are impregnated with the desired resin 72. The particular type of resin selected will be chosen for its characteristics with respect to the specific service conditions it will need to endure. Among those resins generally suitable for FRP members are the polyesters, the vinylesters and the epoxies. Additional factors which may be considered in selection of the resin are viscosity, gel time, strength, moduli, shrinkage after curing and cost. Ingredients such as pigments, catalysts and fillers are common additives to a resin mixture, and the term resin as used hereinafter is intended to include any mixture of ingredients generally suitable for FRP members. The foregoing resins are generally cured by heat, and the reaction is ordinarily initiated in the range of 250° to 280° F. (121° to 138° C.), but because the reaction is exothermic, the temperature may rise to over 400° F. (204° C.) and it is therefore understood that the temperature ranges will vary with respect to the type of resin selected.

Figure 7:
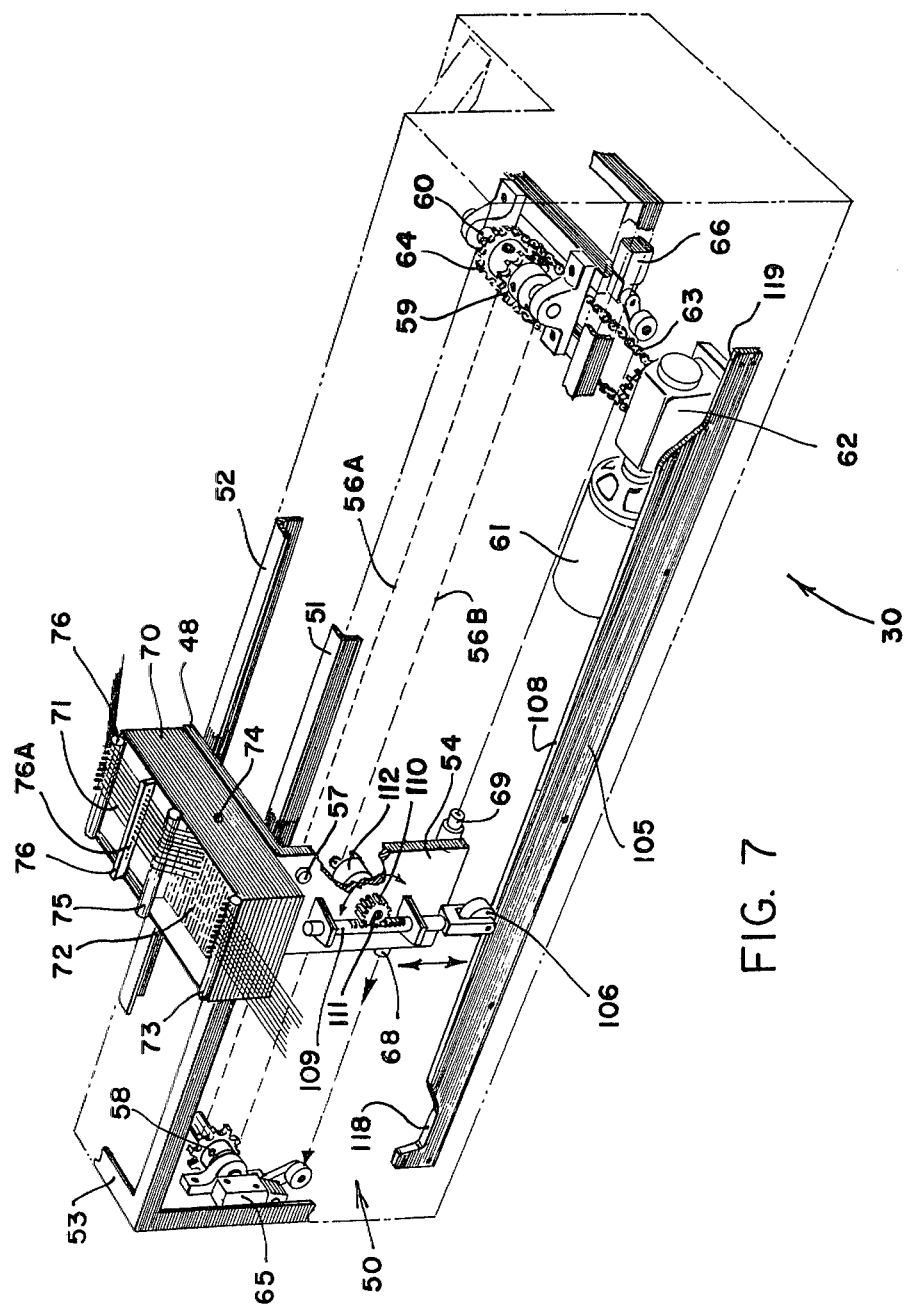
FIG. 7 is a schematic rear perspective of the apparatus depicted in FIG. 5.

As can be seen by reference to FIGS. 6 and 7, a plurality of continuous strands of fiber reinforcing such as glass, graphite or other filaments, either natural or synthetic, are singularly and/or collectively designated by the numeral 71.

In order to achieve the fullest possible impregnation of the resin into the reinforcing strands 71 the strands are fully immersed within the resin reservoir in the tank 70. The strands 71 pass over a separating and aligning comb 73, beneath an immersion bar 74 within the reservoir of resin 72 in tank 70 and then upwardly out of the tank 70 over a first bar 15, through orifices 76a in bar 76 which control the resin content in the laminate, and over a guide comb 77.

Figure 8:
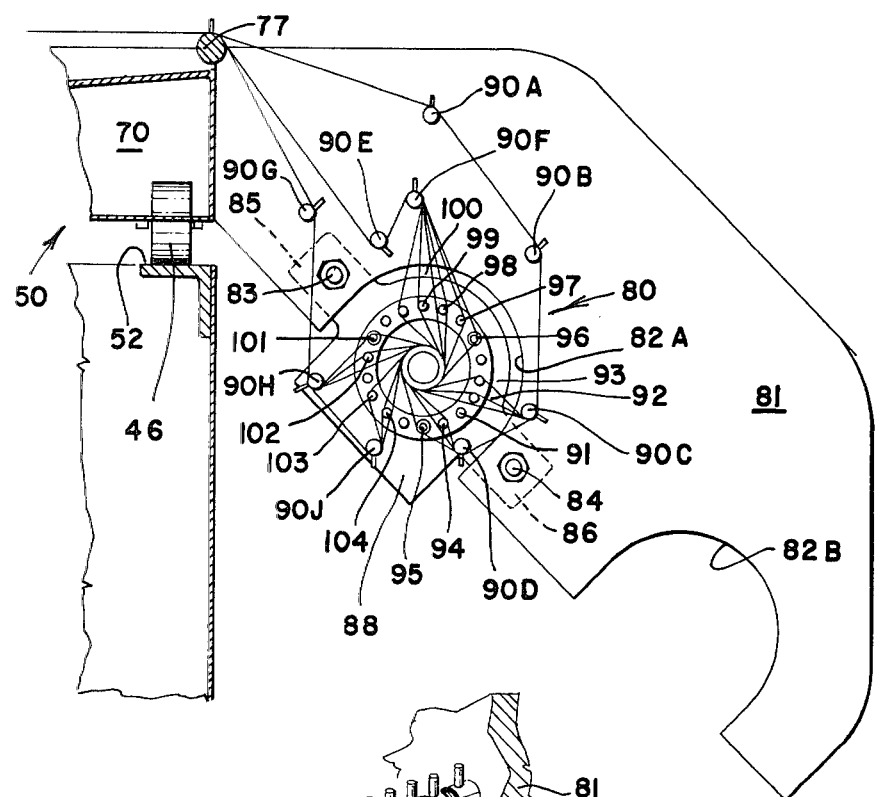
FIG. 8 is an end elevation of the winding head and supporting mechanism by which the reinforcing filaments are directed to the rotating mandrel by the apparatus depicted in FIGS. 4 and 5.
Figure 9:
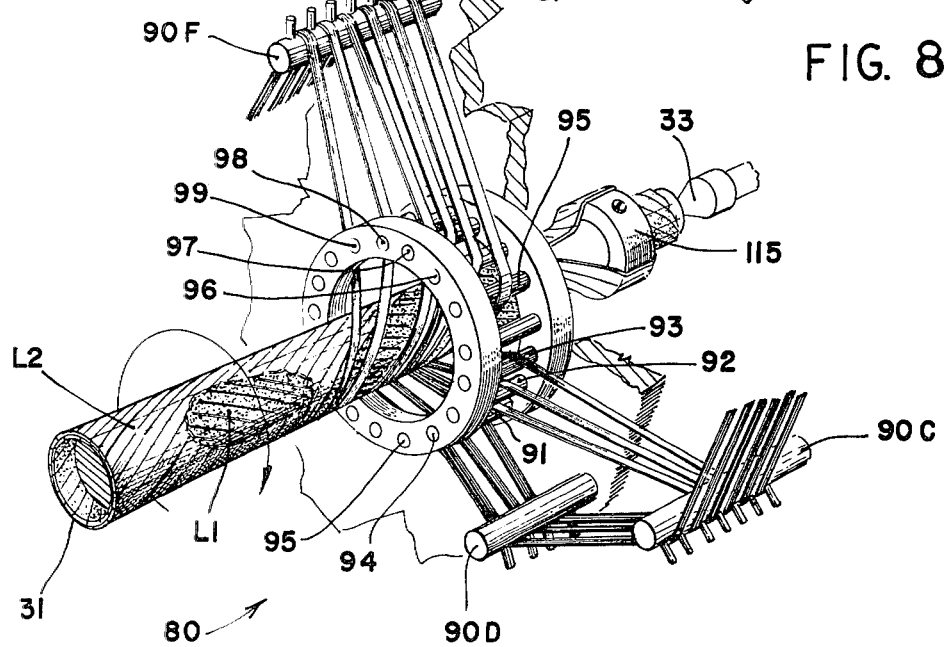
FIG. 9 is an enlarged perspective view of a portion of the filament winding mechanism depicted in FIG. 7 and partially broken away to depict the discrete layers in which the reinforcing filaments of common hand are being wound onto the mandrel and to depict the means by which to anchor the reinforcing strands between relative passes of the mandrel and winding head.

The winding head 80, which directs the reinforcing strands 71 onto the mandrel 31 and which is best seen in FIGS. 8 and 9, is supported on a locator plate 81 which is also carried by trolley 50 and extends outwardly from the tank 70. The winding head 80 fits within a semicircular recess 82A and is secured to the locator plate 81 by nut and bolt combinations 83 and 84 which are connected through arms 85 and 86 extending diametrically outwardly from the mounting plate 88. A second recess 82B may also be provided in the locator plate 81 to permit mounting a second winding head, not shown.

The most uniform results are achieved when the various reinforcing strands 71 are wound onto the mandrel 31 under substantially the same tension, and it has been found that sufficient uniformity results when the strands being fed to various sectors of the winding head 80 are selectively routed across combs which tend to equalize the frictional resistance applied to the individual strands 71.

For example, as the strands 71 which are to feed the three to four o'clock sector of the winding head 80 leave the guide comb 77, they pass across friction combs 90A and 90B at rather obtuse angles before being turned sharply through an acute angle at friction comb 90C into the three to four o'clock sector where they are directed by guide pins 91, 92 and 93 onto the mandrel 31.

Those strands 71 being fed into the five to six o'clock sector of the winding head 80 pass over friction combs 90A, 90B and 90C at oblique angles before being turned through a less severe acute angle by comb 90D before being directed by pins 94 and 95 on the winding head 80 onto the mandrel 31.

Those strands 71 being fed into the eleven to two o'clock sector are turned sharply through a reverse curve by both combs 90E and 90F after leaving the guide comb 77 in order to increase the frictional resistance thereagainst in order to compensate for their closer proximity to the immersion tank 70 before they are directed by guide pins 96 through 100 in the winding head 80 in the eleven to two o'clock sector.

The strands 71 being fed into the nine to ten o'clock sector pass at an obtuse angle across comb 90G and at an acute angle across comb 90H before being directed by pins 101 and 102 in the winding head 80 onto the mandrel 31.

Finally, those strands 71 being fed into the seven to eight o'clock sector pass across both combs 90G and 90H at an obtuse angle before being turned at a moderately acute angle by comb 90J toward pins 103 and 104 in the traverse head 80 onto mandrel 31.

In the embodiment depicted in FIGS. 6–9 the trolley 50 is moved at a constant speed by a motor 61 so that the winding head 80 will move at a correspondingly uniform rate along mandrel 31. However, depending upon the taper, or compound tapers, of mandrel 31 it may be necessary to adjust the rotational speed of the mandrel in order to achieve the desired lead angle for the helical wind of the reinforcing strands 71 thereon. Should it be desired to maintain a constant lead angle, as depicted in FIG. 4, the mandrel 31 will be required to rotate at an increased rate as the diameter of the mandrel decreases.

One manner in which this result is effected is best depicted in FIG. 7. A cam plate 105 is secured to the apparatus 30, and a cam follower 106 rolls along the cam surface 108. The follower 106 may be secured to a rack 109 which rotates a pinion 110 on the control shaft 111 of a linear potentiometer 112 connected in series with the DC motor 35 (FIG. 6) which rotates the mandrel 31. Thus, by coordinating the inclination of the cam surface 108 to the taper, or tapers, of the mandrel 31, the mandrel can be rotated at varying, but controlled, rates to achieve the desired lead angle, or angles, for the reinforcing strands helically wrapped thereon. The base rate, or plateau, at which the mandrel rotates can be selected by virtue of the variable speed pulleys 39 and 40, and the configuration of the cam surface 108 will control the speed with reference to that plateau. Thus, selection of the plateau determines the basic lead angle and the cam surface 108 determines lead angle variations, if any, with respect to the basic lead angle. The lead angle must be at an angle less than 90°—an angle as large as 88° has been successfully applied for the subject apparatus. While most application will require the lead angle of the reinforcing filaments to fall within the range of 88° to approximately 45°, it is expected that some applications will require FRP members in which the lead angle of reinforcing filaments can approach approximately 10°. It should, however, be understood that FRP members to which this invention is directed employ an expanded helix; thus, the lead angle for reinforcing strands in FRP members embodying the concept of the present invention will not approximate 90°.

Referring again to FIG. 6 it will be noted that a first collar 113 is provided on the mandrel 31 in proximity to the butt end 114 thereof and a second collar 115 is provided in proximity to the tip 116 thereof. The space between the collars 113 and 115 delineates the axial extent of the FRP member being made on the mandrel 31, and the space beyond the collars is the waste on which the strands 71 are anchored preparatory to applying a discrete layer of opposite hand.

In order to assure a proper anchoring of the strands exteriorily of the collars 113 and 115 rather sharp depressions 118 and 119 are provided, one at each end of the cam surface 108. The depressions 118 and 119 actuate the potentiometer 112 to effect a sharp increase in the rotational speed of the mandrel 31 and are located such that this increase occurs when the winding head 80 is applying the strands 71 exteriorily of the collars 113 and 115, thus assuring sufficient overlapping of the strands to anchor them preparatory to the application of the successive wrap.

It must be appreciated that a sufficient number of strands are preferably fed into the winding head 80 so that a discrete layer of reinforcing strands will cover the mandrel at one pass. In this way the rotational direction of the mandrel need not be reversed to apply successive discrete layers of opposite hand with each pass of the winding head along the mandrel. In this regard please note the details in the cut-away section of FIG. 9, wherein the discrete layer $L_1$ is being overlaid with a discrete layer $L_2$.

It is, of course, possible to apply a lesser number of strands, but in order for discrete layers to be applied it would then be necessary to reverse the rotational direction of the mandrel with each pass until a discrete layer was formed. This requires extremely exacting coordination between rotation of the mandrel and axial movement of the winding head in order that the successive strands would juxtapose to achieve each discrete layer desired. It will be appreciated that the difficulty of achieving juxtaposition by the successive wraps is further compounded by the necessity of introducing a dwell in the relative axial movement between the mandrel and the winding head as the mandrel continues rotating to anchor the strands before initiating the successive pass. Thus, considerable complications can be avoided simply by applying a discrete layer with each pass, as is readily accomplished with the subject apparatus.

It should also be appreciated that the number of strands required simply to cover the butt portion 114 between the collars 113 and 115 of the mandrel 31 may bunch somewhat when being wound onto the tip 116. This has been found to be perfectly acceptable and in no way denigrates the advantages achieved by the present invention over the prior art.

In the foregoing embodiment the rotational rate of the mandrel was varied in relation to the constant rate at which the winding head axially traversed the mandrel in order to achieve the desired lead angle for the helical lay of the reinforcing filaments. It is also possible to vary the rate at which the winding head traverses the mandrel while rotating the mandrel at a constant rate. One embodiment by which this alternative has been achieved is schematically depicted in FIG. 10.

Figure 10:
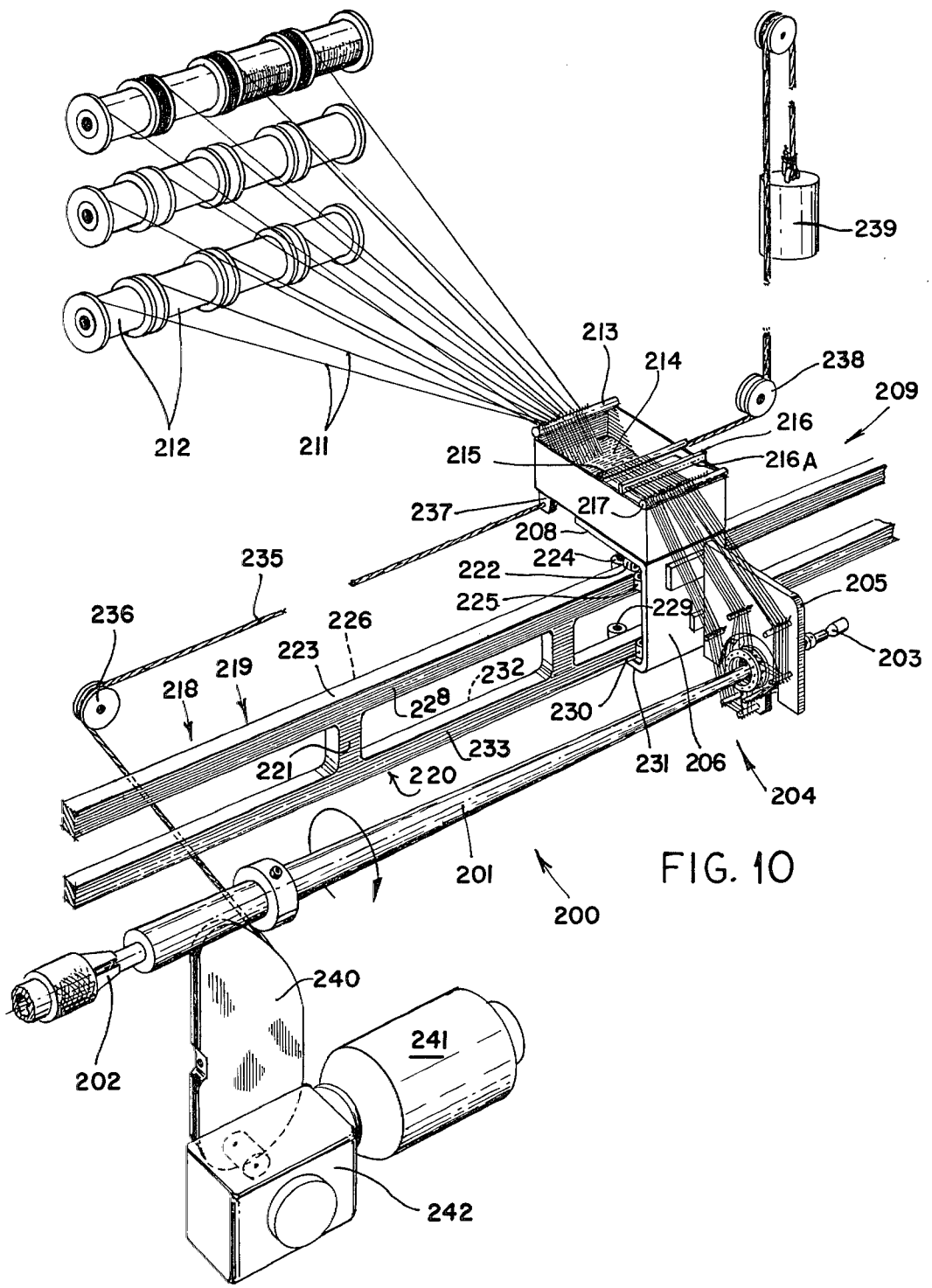
FIG. 10 is a schematic perspective of an alternative embodiment of apparatus according to the concept of the present invention, and capable of performing the method thereof; and, FIG. 11 is a schematic perspective of another alternative embodiment of apparatus according to the concept of the present invention, and capable of performing the method thereof.

The alternative apparatus 200 represented in FIG. 10 rotates a mandrel 201 between live and dead spindles 202 and 203, respectively, and the live spindle 202 is rotated at a constant speed by a motor means not shown.

The winding head 204 is presented from a locator plate 205 that is secured to an arm 206 which extends vertically downwardly from one end of the horizontal base plate 208 on trolley 209.

An immersion tank 210 is carried on the base plate 208 of the trolley 209, and the reinforcing strands 211 fed from a creel of spools 212 pass across a separating and aligning comb 213 through the resin bath 214 and out over a bar 215, through orifices 216a in bar 216 for control of the resin content in the laminate, and finally over guide comb 217 to feed the various sectors of the winding head 204, as hereinbefore explained in conjunction with the description of the previously described apparatus 30.

The trolley 209 is movable along, and stabilized by, a trackway 218 comprising a portion of the frame for the apparatus 200. In the embodiment depicted, the trackway has upper and lower rails 219 and 220, respectively, interconnected by vertical tie bars 221. Downwardly directed rollers 222 carried on the base plate 208 engage the upwardly directed surface 223 on rail 219, and upper, lateral, stabilizing rollers 224 and 225 engage the opposite sides 226 and 228 of the upper rail 219. A pair of lower, lateral, stabilizing rollers 229 and 230, which are carried on a horizontal flange 231 extending from the arm 206 beneath the lower rail 220, engage the lateral sides 232 and 233 of the lower rail 220.

That length of a chain 235 which extends between orienting pulleys 236 and 238 is connected to the trolley 209, as at 237, and moves it along the trackway 218. That end of the chain 235 which extends beyond orienting pulley 238 is connected to a counterweight 239, and that end which extends beyond orienting pulley 236 is connected to a timing cam 240.

The cam 240 is driven by a motor 241 connected thereto through a gear reducer 242, and the configuration of the cam 240 is determined so that the throw, or eccentricity, it provides to the chain 235 at every instant during rotation of the cam by motor 241 is coordinated with the location of the winding head 204 along the axial extent of the mandrel 201, thereby controlling the traversing speed of the winding head as it moves axially along the mandrel. The counterweight 239 assures that the trolley 209 will move to the full extent permitted by the cam 240. In this way one can predetermine the lead angle at which the reinforcing strands 211 are wound onto the mandrel 201.

If a discrete layer of reinforcing strands are applied to the mandrel at each pass of the winding head, the mandrel may be rotated at a constant speed in one direction, but the motor 241 which moves the trolley 239 must be reversed at the conclusion of each pass. This can be accomplished by means well known to the art, exemplary of which would be the use of micro switches, not shown, engageable by the trolley as it reaches each end of its desired travel.

Variation of the rate at which the winding head moves with respect to the mandrel, while maintaining the rotational rate of the mandrel constant, can also be achieved by axial movement of the mandrel past a fixedly located winding head. This concept finds particular suitability when the FRP member requires a relatively large number of reinforcing strands, and a schematic representation of such an apparatus is identified generally by the numeral 300 in FIG. 11.

Figure 11:
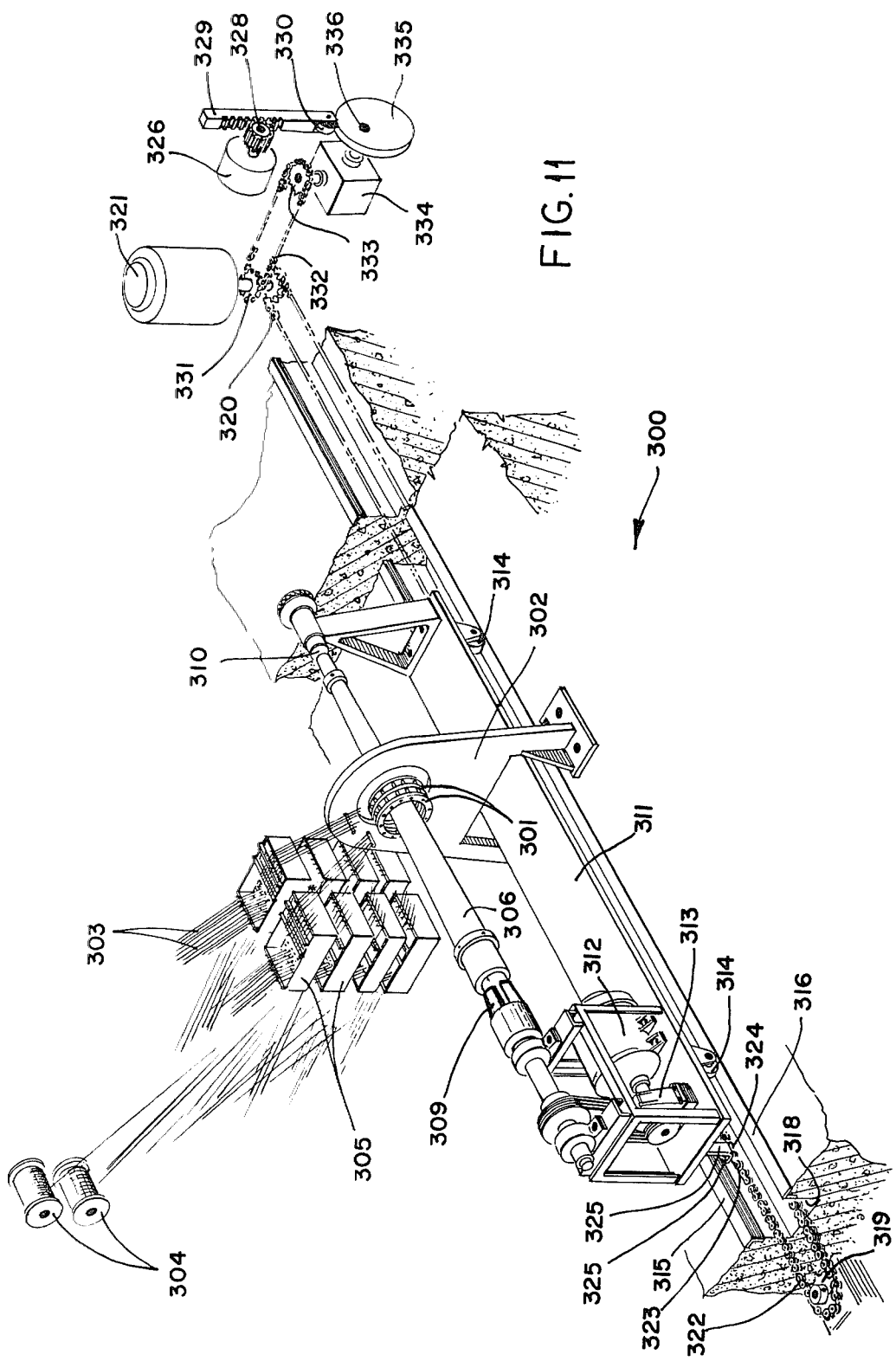

A plurality of winding heads 301 are fixedly supported on a stanchion 302, and each is fed with a plurality of reinforcing strands 303 from banked creels 304, the reinforcing strands passing through banked immersion tanks 305. In order to supply a sufficient number of reinforcing strands it may be necessary to bank the creels and immersion tanks on both sides of the stanchion 302 rather than just on the one side, as depicted in FIG. 11.

A mandrel 306 is rotatably mounted between a live and a dead spindle 309 and 310, respectively, carried on a trolley 311. A motor 312 and gear reducer 313 are also mounted on the trolley and are operatively connected to rotate the mandrel 306 at a preselected constant speed. The trolley 311 itself is movably supported on a plurality of wheels 314 which ride along rails 315 and 316 on each side of a pit 318.

An idler sprocket 319 is rotatably mounted at one end of the pit 318, and a drive sprocket 320 is mounted at the opposite end thereof to be selectively rotated by a DC motor 321.

A continuous, chain drive 322 extends around and between the sprockets 319 and 320, and at least one link 323 thereof is secured, as at 324, to a foot flange 325 presented from the trolley 311. Thus, operation of the DC motor 321 determines both the rate at which, and the extent to which, the trolley 311 moves along the rails 315 and 316, and one manner in which to control the motor 321 is by the regulating cam driven potentiometer 326.

The cam driven potentiometer 326 is provided with a pinion 328 rotated by a rack 329 which in turn carries a cam follower 330 at one end. A second sprocket 331 is provided on the output shaft of the motor 321 and a continuous chain 332 extends around sprocket 331 and a sprocket 333 on the input shaft of a gear reducer 334. A cam 335 is affixed to the output shaft 336 of gear reducer 334 and communicates with cam follower 330. Rotation of the cam 335 is preferably through 270° which causes sufficient movement of the rack 329 and rotation of the pinion 328 for the potentiometer 326 to vary the axial translation of the trolley 311 while the mandrel 306 is rotating so as to achieve the desired lead angle. By changing the cam 335, the desired lead angle may be varied for the continuous helical wrapping of the reinforcing strands upon the mandrel. Of course, the gear reducer 334 enables cams of relatively small diameter, e.g., several inches (cm), to be employed despite axial reciprocation of the trolley 311 over many feet (m).

Thus, the aforedescribed, unique apparatus and method can produce novel FRP members in which the reinforcing strands of common hand are layed in discrete layers and at pre-selected, constant, or varied, lead angles and otherwise accomplish the objects of the invention. As will be apparent to those skilled in the art, combinations of the foregoing embodiments, such as the simultaneous variation of mandrel rotation and relative axial movement between mandrel and winding head, may be employed without departing from the scope of the invention.

I claim:

1. A tubular fiber reinforced plastic member of variable diameter comprising: a resin base; a plurality of substantially contiguous individual reinforcing strands disposed in right and left hand helices without longitudinal reinforcement; the individual reinforcing strands of each hand forming expanded helices having a controlled predetermined lead angle of at least 10° at any point along the length of the member independently of the diameter thereof; the helices of one hand being contained in at least one complete and discrete layer radially disposed of at least one complete and discrete layer comprised of the helices of opposite hand without interweaving of the strands comprising each of the separate layers.

2. A tubular fiber reinforced plastic member as set forth in claim 1, in which the helices of each hand have a pre-selected, constant lead angle throughout the length of the member.

3. A tubular fiber reinforced plastic member, as set forth in claim 1, in which the helices of each hand have a lead angle that is varied as desired along the length of the member independently of the diameter thereof in order to impart desired structural characteristics; and, in which the lead angle of the helices in one layer is equal to the lead angle of the helices in each other layer at the corresponding longitudinal position along the length of the member.

4. A tubular fiber reinforced plastic member, as set forth in claim 1, in which the expanded helices have a lead angle falling within the range of from 88° to approximately 10°.

* * * * *